May 16, 1933.　　　R. S. HOPKINS　　　1,908,845

APPARATUS FOR HANDLING DISCRETE DOCUMENTS

Filed July 11, 1932

Inventor:
Roy S. Hopkins,
By
Attorneys

Patented May 16, 1933

1,908,845

UNITED STATES PATENT OFFICE

ROY S. HOPKINS, OF ROCHESTER, NEW YORK, ASSIGNOR TO EASTMAN KODAK COMPANY, OF ROCHESTER, NEW YORK, A CORPORATION OF NEW YORK

APPARATUS FOR HANDLING DISCRETE DOCUMENTS

Application filed July 11, 1932. Serial No. 621,869.

My invention relates to sheet handling apparatus and particularly to means for orienting discrete documents in photographic copying apparatus. My invention is particularly applicable to photographic apparatus for the recording of such documents described in co-pending application Serial No. 478,838 filed August 30, 1930 by Roy S. Hopkins and Carter J. Hughey and has for an object the provision of means for straightening documents which may be fed to the apparatus in other than a square position.

Another object of my invention is to provide document feeding apparatus which delays during the feeding operation the advance of the corners of the document until the central portion of the document is moved forward sufficiently to square the document with the apparatus.

Other objects and advantages of my invention will appear in the following description when read in connection with the accompanying drawing and its scope will be pointed out in the appended claims.

Figure 1:
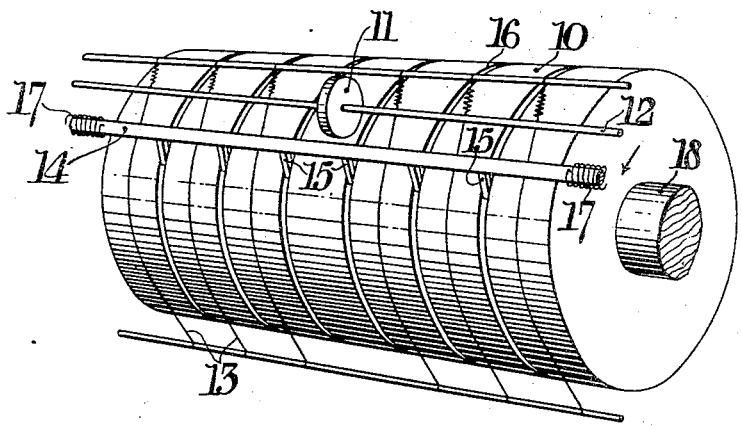
Figure 1 is a perspective view of one form of apparatus designed to carry out my invention.

Referring to the drawing a drum 10 mounted on a shaft 18 is adapted to be driven in the direction indicated by the arrow by any suitable means, not shown, to carry documents or other graphic records bodily through the photographic field of a camera as fully described in the above identified application. It is desirable to have the document square with the photographic field when passing therethrough and to accomplish this I provide apparatus cooperating with the drum 10 to adjust properly any documents which approach the apparatus in other than a square relation. A document placed on the rotary drum 10 in square relation thereto needs no adjustment and will pass between the drum 10 and the roller 11 mounted on a shaft 12 which is adapted to be rotated by any suitable means at a speed such that the peripheral speed of the roller 11 is approximately equal to the peripheral speed of the drum 10. After passing under the roller 11 the document is fed under tension wires 13 which serve to keep it flat and firmly pressed against the drum 10 during its passage through the photographic field of the camera. The wires 13 are only in contact with the portion of the drum 10 included in the photographic field and at their lower end leave the drum 10 at a tangent thereby permitting the document free discharge from the drum 10.

Figure 2:
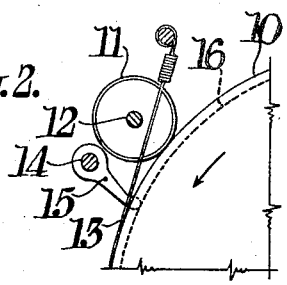
Figure 2 is a fragmentary end view showing the relative positions of the pertinent parts of the apparatus of Figure 1.

Fixedly mounted on a shaft 14 are a plurality of fingers 15 which normally ride in circumferential groove 16 axially spaced along the drum 10 and are adapted to be displaced from the groove 16 by a document passing thereunder. The shaft 14 is provided with biasing springs 17 which serve to hold the fingers 15 yieldably in the grooves 16. As best shown in Figure 2 the fingers 15 are positioned to contact the forward edge of a document just before the document would be gripped between the wires 13 and the drum 10. The strength of the springs 17 are so adjusted that the bias imparted to the fingers 15 through the shaft 14 cannot be overcome and the fingers 15 displaced from the groove 16 by the pressure of the document acted upon solely by the friction of the drum 10, but with the central portion of the document engaged by the drum 10 and the roller 11 the document is moved forward with a force sufficient to displace the fingers 15 against the bias furnished by the springs 17 and its forward edge is gripped between the wires 13 and the drum 10 thereby developing enough friction between the document and the drum 10 to carry it bodily through the photographic field.

It will be apparent from the above description that if a document such as an ordinary bank check is fed onto the drum 10 in other than straight position the foremost corner of the check will come to rest against one of the fingers 15 since the wires 13 do not contact with the drum 10 at this point and the corner of the check will not be driven forward with sufficient force to displace the fingers 15 against the bias of the springs 17. The check at its central portion is now engaged by the roller 11 and the drum 10 and is pivoted about the advance corner until the entire front edge of the check presses against the fingers 15. The increased pressure then displaces the fingers 15 against the bias of the springs 17 and the check is in a properly oriented position when it is gripped between the wires 13 and the drum 10 and carried through the photographic field to be discharged near the lower part of the drum 10.

The roller 11 has been described as being driven, but the apparatus will function quite satisfactorily if the roller 11 is mounted for free rotation on the shaft 12, the main requirement being that it press a document passing thereunder against the drum with sufficient force to cause the rotating drum 10 to advance the document.

In the modification shown in Figure 3 the drum 10 is adapted to be rotated as described in connection with Figure 1. The straightening arrangement here illustrated includes a shaft 24 having rigidly secured thereto a plurality of fingers 25 adapted to ride in the circumferential grooves 16 of the drum 10. The shaft 24 also carries a freely mounted roller 21, a fixed arm 26 and a bell crank 27 which is free to rotate on the shaft 24. The roller 21 engages and is adapted to be driven by the rotating drum 10 and functions to press a document against the surface of the drum 10 as does the roller 11 in the apparatus shown in Figure 1. A latch member 28 pivoted at one end on a rod 29 is adapted normally to engage the end of the fixed arm 26 thereby locking the shaft 24 against rotation tending to displace the fingers 25 from the groove 16. The lower arm of the bell crank 27 is adapted to ride in one of the grooves 16 near the center of the drum 10 and occupies a position slightly in advance of the fingers 25, so that the straight edge of a document fed on the drum 10 must displace this arm slightly before it can engage the fingers 25. The other arm of the bell crank 27 extends upwardly and is provided at its ends with a cam surface adapted to bear against the underside of the latch 28. A spring 30 secured to the latch 28 and the upper arm of the bell crank 27 serves to bias the latch 28 to latching position and to force the lower arm into engagement with the bottom of the groove 16 in which it is adapted to ride.

Figure 3:
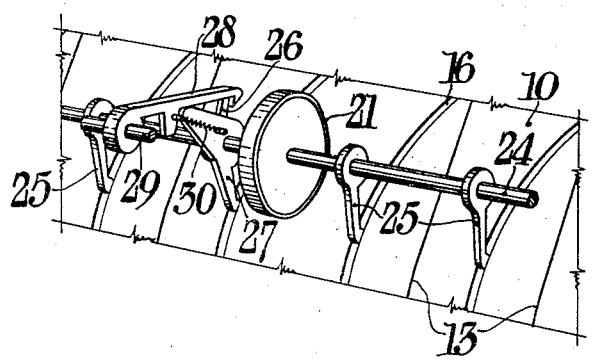
Figure 3 is a fragmentary view in perspective showing a modified form of apparatus made in accordance with my invention.

With the apparatus in the position shown in Figure 3 a check fed onto the drum 10 in other than square position will be stopped by its advance corner engaging with the locked fingers 25. The check then pivots under the roller 21 until it engages and pushes the lower arm of the bell crank 27 into line with the fingers 25. In pushing the lower arm into line with the fingers 25 the upper arm of the bell crank 27 has been gradually raising the latch member 28 so that when the lower arm and the fingers 25 are in line, the arm 26 is released and the check can now displace the fingers 25 and move forward into position to be gripped between the drum 10 and the tensioned wires 13 which act to carry the check through the photographic field located on the drum 10.

If the weight or position of the fingers 25 is not such that the fingers 25 after displacement by a check will return to engagement with the bottom of the groove 16 it will be necessary to force them to return by the provision of some suitable biasing means such as the springs 17 illustrated in Figure 1.

It will be seen from the above description that with the apparatus of my invention, documents passing through a photographic recording machine of the type described in the above identified application will be properly oriented when passing through the photographic field regardless of whether they are fed into the receiving hopper in the proper position or not.

The word "orient" as used in the foregoing description and in the appended claims is to be read as meaning to cause something to take or assume a desired position relative to some object or base. In the present case a document is properly oriented when its forward edge is parallel to the axis of the rotating drum over which it is adapted to pass.

While I have described in detail two arrangements for practicing my invention to comply with the patent statutes, it is to be understood that I do not intend to be limited to the apparatus described inasmuch as in view of the disclosure obvious modifications and uses other than in connection with photographic apparatus will readily suggest themselves to those skilled in this art without departing from the spirit of my invention or the scope of the appended claims.

What I claim as new and desire to secure by Letters Patent of the United States is:

1. In apparatus of the character described, a continuously rotating drum for feeding discrete documents through a photographic field, a plurality of circumferential grooves in the drum, a plurality of fingers biased to ride in said grooves, but yieldingly displaceable from said grooves, and means axially positioned near the center of said drum for pressing the center portion of a document into frictional engagement with said drum whereby the document is driven forward with a force sufficient to displace said fingers from said grooves.

2. In apparatus for handling discrete sheets, a continuously rotating drum adapted to receive a sheet and advance it through an operating position and means cooperating with the drum for orienting a sheet prior to its advance to the operating position, said means comprising a plurality of fingers, resilient means for holding the fingers in contact with the drum, and means for applying to the central portion of the sheet a driving force sufficient to displace the fingers from the drum.

3. In apparatus for handling discrete sheets, a continuously rotating drum adapted to receive a sheet and advance it through an operating position and means cooperating with the drum for orienting the sheet prior to its advance through the operating position, said means comprising a plurality of fingers movable into and out of sheet stopping position, a latch for holding the fingers in sheet stopping position and means operating to disengage the latch when the sheet is advanced against said fingers in oriented position.

4. In apparatus for handling discrete sheets, a continuously rotating member adapted to receive the sheets and advance them through an operating position and means cooperating with said member for orienting the sheets prior to their passage through the operating position, said means comprising a plurality of fingers positioned to halt the advance of the foremost portion of a sheet received in other than oriented position, and means cooperating with said member for rotating the sheet into oriented position and for forcing the sheet forward to displace the fingers from sheet halting position.

5. In apparatus of the character described, a continuously rotating drum adapted to receive and advance a discrete sheet through an operating position and means cooperating with the drum for orienting the sheet prior to its advance through the operating position, said means comprising a plurality of members spaced axially of the drums and operative to restrain the foremost portion of the sheet when received in other than oriented position and means operative to orient said sheet and to overcome the restraint of said members whereby passage of the sheet to the operating position is permitted.

Signed at Rochester, New York this 1st day of July 1932.

ROY S. HOPKINS.